Patented Feb. 29, 1944

2,343,107

UNITED STATES PATENT OFFICE 2,343,107

PREPARATION OF BUTADIENE

Oliver W. Cass and Arthur O. Rogers, Niagara Falls, N. Y., assignors to E. I. du Pont de Nemours & Company, Wilmington, Del., a corporation of Delaware No Drawing. Application October 12, 1938, Serial No. 234,690

4 Claims. (Cl. 260—680)

This invention relates to the preparation of butadiene-1,3 and more particularly to an improved process whereby this compound may be prepared from dichloro derivatives of n-butane in high yields.

Butadiene-1,3 is a colorless liquid having an atmospheric boiling point of −5° to −4° C. and is used in the preparation of synthetic rubber and like products. Previous methods of preparing this compound have involved subjecting certain dichlorobutanes to the action of heat in the presence of a substance, e. g. an alkaline material, which is an acceptor for hydrogen chloride, or in the presence of a material which catalyzes the splitting off of hydrogen chloride. These latter materials have generally consisted of various metal chlorides. It has also been proposed to catalyze the vapor phase formation of butadiene by means of steam. None of these prior methods have proved to be wholly satisfactory from a practical standpoint in that the yields of butadiene resulting therefrom are generally poor.

It is an object of our invention to provide an improved method for preparing butadiene-1,3 from dichlorobutanes or mixtures thereof. A further object is to provide such a method whereby butadiene-1,3 is obtained in high yields as the principal and substantially the only di-olefine reaction product resulting from the dehydrochlorination of dichlorobutanes or mixtures thereof. These and other objects will be apparent from the ensuing description of the present invention.

The above objects may be accomplished in accordance with our invention by subjecting vapors of a dichlorobutane to the action of heat at elevated temperatures in the absence of dehydrochlorination catalysts or acid acceptors. We have discovered that not only will the dehydrochlorination of the dichlorobutanes or mixtures thereof, such as those obtainable from the chlorination of n-butane or n-butenes, proceed readily at temperatures within the range of 450–700° C. in the absence of dehydrochlorination catalysts or acid acceptors to produce butadiene, but that the absence of such a catalyst is distinctly advantageous in that substantially no by-product di-olefines are produced and yields of the desired product may be obtained which are substantially higher than those obtainable when such catalysts or acid acceptors are employed. Thus we have practiced our invention obtaining good yields of butadiene analyzing as high as 95% butadiene-1,3.

Throughout this specification the term "dichlorobutanes" is used to mean only straight chain compounds, e. g. the dichlorides of n-butane.

In practicing our invention, excellent results may be obtained, as illustrated in the accompanying examples, using an unpacked reaction space such as is provided by a single unpacked reaction tube. However, our invention may also be practiced employing a reaction space packed with an inert material such as pieces of glass or the like. The use of an inert packing might be especially advantageous under certain circumstances in that it would assist in maintaining temperature levels within a desired range. Another manner of maintaining desired temperature levels is to use a multiple tube reactor, the individual tubes of which may be either unpacked or packed with an inert material.

Regardless of which dichlorobutane is employed as raw material, the resulting di-olefine reaction product will be found to consist chiefly of butadiene-1,3. Thus, 1,2-dichlorobutane, 1,3-dichlorobutane, 2,3-dichlorobutane, 1,4-dichlorobutane or mixtures of any of these compounds may be dehydrochlorinated by the present method to give butadiene-1,3 as substantially the only di-olefine reaction product. Although the yields obtainable may vary slightly depending upon which particular dichlorobutane is employed, any of these starting materials or mixtures thereof may be used with good results in accordance with our invention. A convenient source of raw material is the mixture of isomeric dichlorobutanes obtainable by chlorinating n-butane in the presence of light or by the chlorination of butene-1 or butene-2 or mixtures thereof.

A convenient and practical manner of practicing our invention consists in passing vapors of a dichlorobutane of the type above specified from a boiling body thereof through a reaction zone heated to the required temperature and then partially condensing the off gases from the reaction zone to separate unconverted dichlorobutane and monochlorobutenes which are recirculated through the reaction space. The butadiene that is formed upon passage through the heated space may be freed from hydrogen chloride by passage through water scrubbers and then condensed or otherwise treated as desired.

The following examples illustrate one method of preparing butadiene in accordance with the present invention.

*Example 1*

2,3-dichlorobutane, 63.5 grams, contained in a distillation flask was slowly distilled so that the vapors evolved passed through a glass tube heated to a temperature of about 450° C. The glass tube was constructed of a borosilicate glass sold under the trade name "Pyrex," this glass being characterized by its low thermal coefficient of expansion and its high softening temperature. The vapors issuing from this tube were passed through a water cooled reflux condenser which separated the unconverted chlorides from the butadiene, the chlorides being returned to the distillation flask for recirculation through the heated tube. The butadiene vapors were passed through a series of water scrubbers for removal of hydrogen chloride, dried by passage through a calcium chloride drying tube and condensed in a low temperature condenser. As the distillation proceeded the temperature of the reaction tube was gradually increased until at a temperature of about 485° C. cracking of the dichlorobutane became appreciable. At 500–550° C' cracking was at a practical rate and this temperature was maintained throughout the remainder of the run. By recirculating the material not converted to butadiene through the reaction tube for a period of 1½ hours a 70% yield of crude product analyzing about 94% butadiene was obtained.

The purity of the butadiene-1, 3 obtained in the examples herein described was determined by distillation, by absorption in molten maleic anhydride, and by the bromine absorption method.

*Example 2*

This run, employing 762 grams of 2,3-dichlorobutane was carried out in substantially the same manner as in Example 1, the temperature in the heated zone being maintained at 500–550° C. The crude butadiene obtained corresponded to a yield of 90% based on the amount of hydrogen chloride evolved and 89.7% based upon the amount of dichlorobutane consumed. The crude product analyzed 92.5% butadiene.

Upon fractional distillation of the crude product obtained in the above example, a fraction having a boiling range of —5.5° to 0° C. was isolated which analyzed 95% butadiene-1,3. The amount of this purified product actually isolated corresponded to a yield of 70% based upon the dichlorobutane consumed.

*Example 3*

1,2-dichlorobutane, 127 grams, obtained from the chlorination of butene-1 was subjected to the dehydrochlorination treatment described in Example 1, the time of the treatment being one hour and forty minutes. The yield of butadiene-1,3 corresponded to 85–86% of the theory. The crude product obtained analyzed about 95% butadiene by the maleic anhydride absorption method.

*Example 4*

The procedure described in Example 1 was repeated using a mixture of two mols of the dichlorobutanes obtained from the liquid phase chlorination of a mixture of secondary butyl chloride and primary butyl chloride in the presence of light at the atmospheric reflux temperature of the mixture. The reaction time for the dehydrochlorination was 5½ hours and the approximate mean reaction temperature in the pyrolysis tube during the run was 560° C. The yield of crude butadiene was 86.2% and 89.8% based upon the amount of hydrogen chloride evolved and the amount of dichlorides consumed, respectively. The crude product was of 89% purity.

Our method may also be practiced with good results by chlorinating n-butane in the vapor phase, for example at a temperature of 70 to 130° C. in the presence of light and subjecting the mixture of dichlorobutanes obtained to the dehydrochlorination treatment illustrated in the above examples. In the absence of light, chlorination of n-butane may be effected at higher temperatures, e. g. 370 to 400° C., however, a temperature of 450° C. should not be exceeded. The vapor phase chlorination of n-butane may be carried out in the presence of light at a temperature not exceeding about 70° C., e. g. 60 to 70° C., or in the absence of light at a higher temperature to give a mixture of monochlorobutanes. The latter is then chlorinated to the dichloride stage for use in the dehydrochlorination treatment by a liquid phase method in the presence of light and/or a catalyst such as iron filings at a temperature of 0° C. to the atmospheric reflux temperature of the liquid mixture, the reflux temperature being preferred, or by a method involving, for example, straight thermal chlorination in the vapor phase. The dichloride product obtained by the addition of chlorine to butene-1 or butene-2, or mixtures thereof, by a liquid phase reaction in the presence or absence of light at a temperature of about —15 to 30° C. can also be dehydrochlorinated by the method illustrated in the above examples to give good yields of butadiene-1,3.

It is obvious from the above examples that we have discovered a highly practical yet simple method for obtaining good yields of butadiene-1,3 of relatively high purity. The resulting product may be used for the preparation of synthetic rubber according to known procedures.

In carrying out the present method we have found it advantageous to operate during the dehydrochlorination treatment at a temperature of about 500–600° C. although higher or lower temperatures may be used. Cracking of the dichlorobutanes to produce butadiene apparently begins in the neighborhood of 450 to 475° C. and proceeds at a practical rate at a temperature above about 500° C. Temperatures above 600° C., e. g. as high as 700° C., may be used so long as decomposition reactions involving the desired product do not become appreciable.

Our method of operation is not restricted to the use solely of a glass reaction tube as illustrated in the foregoing examples since we have found that the reaction tube may be constructed of iron, stainless steel, copper, nickel and the like materials if desired. In general we prefer to use glass or stainless steel as construction material but other materials such as those noted above may be employed with good results.

A particular advantage of our present method is that the yields of butadiene obtainable thereby are substantially greater than may be obtained by methods known heretofore. A further and distinct advantage is that butadiene-1,3 is substantially the sole di-olefine reaction product regardless of which dichlorobutane is employed. This is evident from distillation analysis of the products resulting when various dichlorobutanes are employed as raw materials. Thus, when either 1,2- or 2,3-dichlorobutane is employed, distillation analyses of the crude product show that it consists chiefly of a butadiene-1,3 fraction and a higher boiling fraction comprising unconverted chloride, there being substantially no intermediate fraction. The same thing is true when the starting material is a mixture of dichlorobutanes, such as the mixture of dichlorobutanes which is obtained when n-butane is chlorinated in the presence of light.

The present method is conveniently carried out at normal pressure although sub or super-atmospheric pressures may be used if desired.

It is apparent that various widely different modifications of our invention may be practiced without departing from the spirit and scope thereof. The invention is therefore not limited by the foregoing description and examples except as indicated in the appended claims.

We claim:

1. The method of preparing butadiene-1,3 comprising passing vapors of 1,2-dichlorobutane under substantially anhydrous conditions through a reaction space in the absence of a catalytic or acid acceptor material at a temperature of 450 to 600° C. and separating butadiene-1,3 from the resulting off gases.

2. A process for the production of butadiene from 1,2-dichlorbutane which comprises subjecting substantially anhydrous vapors of the dichlorbutane to thermal dehydrohalogenation in the absence of a basic agent and of a catalyst and at a temperature in the range of from 500 to 600° C. in an unpacked reaction vessel, and recovering butadiene and anhydrous hydrochloric acid from the resulting mixture.

3. A process for the production of butadiene from 1,2-dichlorbutane which comprises subjecting substantially anhydrous vapors of the dichlorbutane to thermal decomposition in the absence of a basic agent and of a catalytic surface and at a temperature in the range of from 500 to 600° C. in a reaction space containing an inert packing material.

4. A process for the production of butadiene from 1,2-dichlorbutane which comprises subjecting substantially anhydrous vapors of the dichlorbutane to thermal decomposition in the absence of a basic agent and of a catalytic surface and at a temperature in the range of from 500 to 600° C. in an unpacked reaction space, recirculating through said reaction space unconverted products issuing therefrom and separating butadiene-1,3 from the off gases issuing from said reaction space.

OLIVER W. CASS.
ARTHUR O. ROGERS.